April 1, 1958  T. N. DE PEW ET AL  2,828,932
PALLET TIERING FRAMES

Filed April 5, 1954  2 Sheets-Sheet 1

INVENTOR.
THOMAS N. DE PEW & RICHARD H. HEISE
BY
Ralph W. Kalish
ATTORNEY

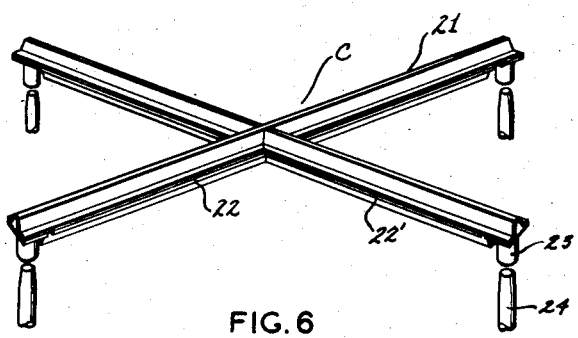
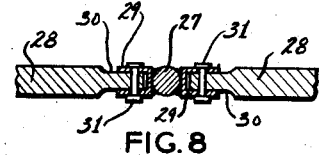
FIG. 6
FIG. 8
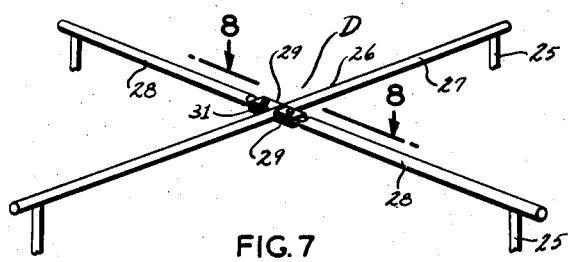
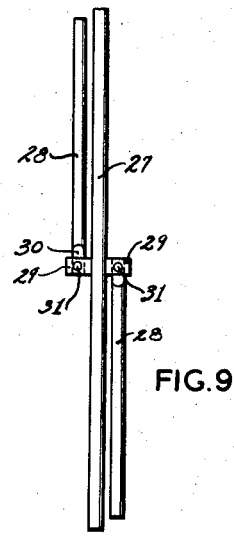
FIG. 7
FIG. 9
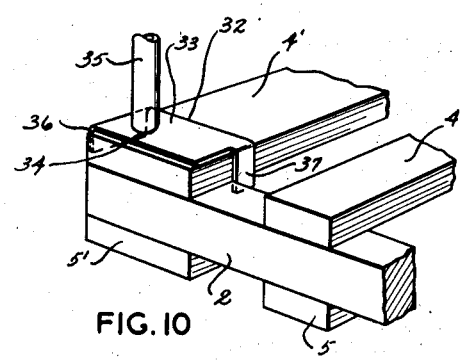
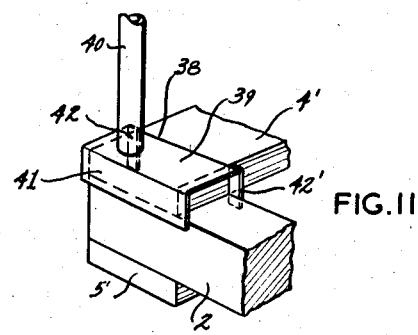
FIG. 10
FIG. 11
INVENTOR.
THOMAS N. DE PEW & RICHARD H. HEISE
BY
Ralph W. Kalish
ATTORNEY United States Patent Office 2,828,932
Patented Apr. 1, 1958

2,828,932
PALLET TIERING FRAMES

Thomas N. De Pew, University City, and Richard H. Heise, Glendale, Mo., assignors, by direct and mesne assignments, to Arrowhead Products, Inc., St. Louis, Mo., a corporation of Arkansas Application April 5, 1954, Serial No. 420,948

6 Claims. (Cl. 248—120)

This invention relates in general to material storage and, more particularly, to pallet tiering frames.

Heretofore, pallets have not been used for storing of certain types of materials which are unable to withstand relatively heavy superimposed loads without being injuriously crushed. As an example of the many articles which fit into this category are automobile truck tires which have a substantial overall thickness and are relatively extensive in diameter. These tires when stacked cannot support any considerable load without damage from compression so that it is necessary to restrict the column to a limited number of tires, such as about eight. This type of storing is obviously uneconomical since the space above the tire stack will either be unused, or will perforce be filled by fixed, strongly-supported shelving. In this latter instance, there is also a question as to how high such shelving can be efficiently provided so that, on balance, much valuable warehousing space is wasted in connection with the storing of truck tires.

Therefore, it is an object of this invention to provide a pallet tiering frame adapted for removable disposition upon a pallet, which is capable of supporting a stacked assembly to protect material stored on the pallet from damage through compression.

Another object is to provide a pallet tiering frame having means for snug-fitted engagement with portions of the pallet whereby the frame is rendered stable in position and the use of tools for application and removal of the frame, and modification in any way of the pallet, are obviated.

Another object of this invention is to provide a frame of the stated character which permits ready, four-way accessibility to the pallet for disposition thereon, or transfer therefrom, of material or articles, without disturbance of any part of the stacked assembly.

Another object is the provision of a pallet tiering frame which can support the load of a stacked assembly thereabove without necessitating a precise alignment of the load elements.

A further object is to provide a frame for pallet stacking which comprises posts or vertical supports, and an upper portion of obliquely-directed, horizontal members meeting at a point substantially vertically aligned with the center of the pallet.

An additional object of this invention is to provide a pallet tiering frame having a foot member associated with each post which is adapted for fitted, griping engagement with portions of the pallet, whereby accidental dislodgment of the frame is prevented.

Another object is to provide a pallet tiering frame which is of two-part construction, with each part being identical so that replacement is easily effected and the storing thereof, when the frame is not in use, requires minimum space since the parts may be nested. Each component is relatively light in weight and can thus be installed on the pallet by a single workman.

An additional object of this invention is to provide a frame which is of unitary construction but adapted for collapsing when not in use so that little space is needed for storage.

A further object is to provide a pallet tiering frame which may be adapted for use with any size, or type pallet; which may be fabricated most economically; and which is durable and reliable in usage.

These and other detailed objects are obtained by the structure illustrated in the accompanying drawings (two sheets) in which—

Figure 6 is an enlarged fragmentary exploded perspective view of the upper portions of a still further form of pallet tiering frame constructed in accordance with the present invention.

Figure 7 is an enlarged fragmentary perspective view of the upper portion of another form of pallet tiering frame constructed in accordance with the present invention.

Figure 8 is a vertical transverse section taken on the line 8—8 of Figure 7.

Figure 9 is a fragmentary top plan view of the frame shown in Figure 7, illustrating the same in collapsed condition.

Figure 10 is an enlarged perspective view of another form of foot member for pallet tiering frames of the present invention.

Figure 11 is an enlarged perspective view of a still further form of foot member for pallet tiering frames of the present invention.

Figures 1, 2, 3, 4, 5:
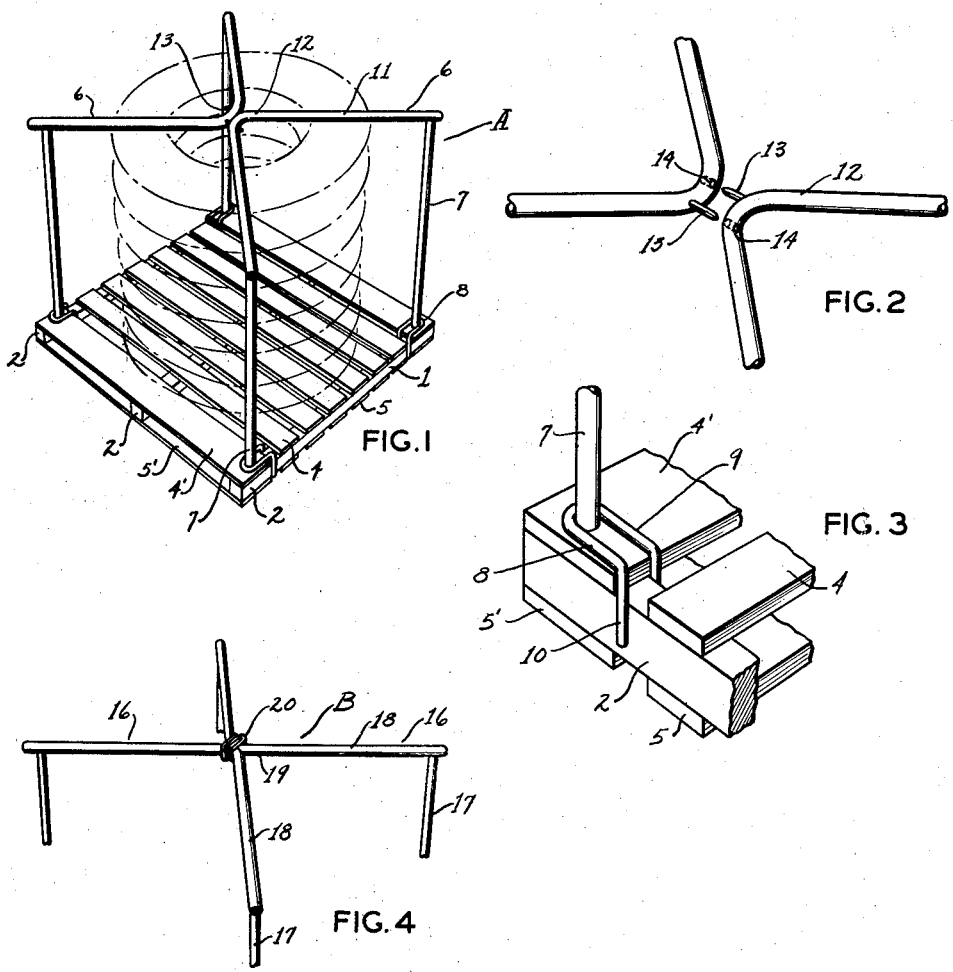
Figure 1 is a perspective view of a pallet tiering frame constructed in accordance with and embodying the present invention, showing the frame in mounted disposition on a pallet.
Figure 2 is an enlarged fragmentary perspective view of the upper portions of the frame parts in aligned, but disengaged, relation.
Figure 3 is an enlarged perspective view of a foot portion of the frame as engaged on a pallet.
Figure 4 is a fragmentary perspective view of the upper portion of another form of pallet tiering frame constructed in accordance with the present invention.
Figure 5 is an enlarged fragmentary perspective view of the upper portions of the constituent parts of the form of frame shown in Figure 4, which such parts being in aligned, but disengaged, relation.

In the drawings, 1 designates a conventional pallet having parallel stringers 2 and upper and lower decks or platforms comprised of spaced boards 4, 5, respectively, with the outer boards 4', 5', of said decks being of increased width. Provided for application upon pallet 1 is a tiering frame generally indicated A and in the embodiment of this invention illustrated in Figure 1 comprises a pair of identical component sections 6. Each section 6 includes a pair of posts or vertical supports 7 for disposition at adjacent corners of pallet and at the lower end of each post there is rigidly secured a foot or base member 8. Each foot member 8 is preferably of rod construction and consists of an upper horizontal U-shaped portion 9, being fixed to the associated post 7 at the bend of the U-shape, as by welding, and with the legs presented upon the upper surface of the adjacent deck board 4' extending in a direction axially normal thereto and toward the foot 8 of the other post 7 of the same section 6. At their ends, the legs of each foot 8 are turned downwardly to provide depending portions 10 for presentation on opposite sides of the proximate stringer 2 (see Figure 3). The distance between depending portions 10 is slightly less than the thickness of stringer 2 so that the latter will be snugly embraced therebetween. Furthermore, abutment between the inner edge of the adjacent deck board 4' and the inner faces of depending portions 10 is achieved so that each section 6 is stable when mounted and thus secure against accidental dislodgment.

At the upper end of each post 7 there is secured the end portion of a leg 11 of a V-shaped upper element 12, which may be of tubular stock, disposed in planar, parallel relation to pallet 1 and with the angle of the V or junction of legs 11 being directed toward a point substantially vertically aligned with the center point of pallet 1. In the angle or crotch of element 12, an outwardly projecting pin 13 is affixed and provided adjacent thereto is an axially parallel aperture 14 of complementary diameter. Since the component sections 6 of frame A are identical, the pin 13 of one section will be aligned with the aperture 14 of the other section when said sections are mounted on pallet 1 whereby the same may be interengaged in their upper elements 12 for mutual reinforcement to complete formation of frame A and firmly establish same for supporting loads. As thus joined, upper elements 12 cooperate to provide a strong top to frame A which is capable of resisting buckling under superimposed loads. Therefore, in stacking, the next pallet is placed upon the top of the frame A immediately thereunder and tiers comprising at least four pallet and frame units can be effected.

Posts 7 are presented for location at each corner of pallet 1 providing maximum access therebetween for placing upon, and removal from, pallet 1 of material or articles in a manner which will not interfere or disturb material stored on other pallets in the tier. Articles, such as automobile truck tires, stored on pallets 1 are protected by frame A from the force developed by the weight of materials stored thereabove so as to avoid any damaging compression of the tires or other stored materials. In the case of tires of this character, it has been found that a pile eight-high will not cause injury to the lower ones. Thus, frame A may be of such height as to receive therein this number of tires. Using the present invention, a stack assembly of four pallets having a total of thirty-two tires can be accommodated in the amount of floor space as was previously required for but eight tires. The resultant economy in warehouse space is most apparent.

Frame A is relatively light weight and is self-contained, there being no loose, associated parts, so that reliable application on pallet 1 is readily accomplished by a single workman without the use of tools. Each section 6 is placed in position and then pins 13 are engaged with corresponding apertures 14. There is no positive engagement between frame A and the pallet immediately thereabove, since the latter is merely restingly disposed thereon. Consequently, the use of frame A does not necessitate modification of pallets in any manner, such as by securing thereto appliances for cooperation with parts of the frame as is common with stacking structures heretofore known. It is, of course, obvious that frames A can be dimensioned for use with any size or type pallet.

The particular confiuration of section 6 adapts same for nesting when frame A is not used so that minimum storage space is required.

Figure 4 illustrates another form of pallet tiering frame indicated B comprising a pair of identical component sections 16 each of which includes a pair of posts or uprights 17 which are provided at their lower ends with foot members (not shown) for application on pallet 1, all as hereinabove set forth in connection with frame A. The posts 17 of each section 16 are secured at their upper ends to the end portion of the legs 18 of a V-shaped upper element 19 formed from two sections of, desirably, tubular stock, which are welded to form the angle of the V. Fixed on element 19 at the junction of legs 18 is a vertically arranged hook member 20, constructed as of strap metal, which lockingly interfits with the corresponding hook 20 on the other component section 16 for reliable union to render frame B sturdy and capable of supporting substantial loads.

Figure 6 shows a further form of pallet tiering frame, designated C, comprising a unitarily formed, X-shaped top element 21 fabricated of suitable stock, such as pipes, registering angle posts, or the like, which includes an integral member 22 with the other member 22' being of two-part construction and each being rigid at its inner end with member 22. At each end of member 22 and the outer ends of each part of member 22' there is provided a downwardly opening socket or cup-like receptacle 23 for projection thereinto of the upper ends of posts or uprights 24. Each post 24 may be individually mounted upon pallet 1 as by a foot member of the type indicated at 8 in Figure 3. Top element 21 is thus securely disposed upon posts 24 by reception of the upper ends thereof within sockets 23. The structural independence of posts 24 and top element 21 adapt frame C for ready assembly and dismantling and for compact storing when not used.

A further form of pallet tiering frame is illustrated at Figure 7, being broadly denoted D, and comprises spaced posts or uprights 25 which may be equipped with foot members of the type shown at 8 in Figure 3 for engagement upon pallet 1 adjacent the corners thereof. At their upper ends, each post 25 is secured to an end of a generally X-shaped top portion 26 which includes a unitary member 27, as of piping or rodding, extending between one pair of obliquely related posts 25, and a pair of relatively shorter, normally axially aligned members 28 extending between one post of the other obliquely related pair and unitary member 27. At its center portion, unitary member 27 is provided on diametrally opposite faces with bifurcated or clevis-type brackets 29 within which are received the flattened inner ends 30 of members 28 for swingable mounting thereof by means of pivot pins 31. Thus, each member 28, together with its associated post 25 may be swung toward and away from unitary member 27 so that when frame D is not in use, the same may be collapsed for storage in a small space (see Figure 9).

If desired, another form of foot or base member may be provided for use with any of the frames A, B, C, and D above described. The embodiment 32 shown in Figure 10 comprises a main, plate-like portion 33 drilled, as at 34, to receive the lower end of a post or upright 35 fixed thereto as by welding. Plate portion 33 is of a width corresponding to that of the proximate deck board 4' and at its outer end is turned down to form a depending flange 36 for abutment against the outer edge face of deck board 4'. At its opposite or inner end, plate portion 33 is provided at one side with a narrow depending finger 37 in planar parallel relation to flange 36, which abuts against the inner edge face of board 4' and projects downwardly therebelow for contact on one side edge with the inner face of the adjacent stringer 2. Thus, foot members 32 snugly embrace the outer deck boards 4' and by abutment against the edge surfaces thereof and against stringer 2 are secure against undesired displacement.

Figure 11 illustrates an additional form of foot for base member designated 38, which may be used, in lieu of foot members 8 or 32 above described, with any of the frames A, B, C, or D. Foot member 38 comprises a top plate-like portion 39 which at its ends projects a limited distance beyond the sides of the adjacent deck board 4', and is adapted to receive an upright 40 in the same manner as foot member 32. On one side, foot member 38 is provided with a depending flange 41 which extends the length thereof for abutting engagement with the adjacent end surface of deck board 4'. On its opposite side, foot member 38 is formed to present in each end projecting portion a down-turned finger 42, 42'; with the former edge-wise contacting the outer face of deck board 4' while the latter or inner finger 42' abuts on one edge against the inner surface of deck board 4' and also abuts in its lower end face against stringer 2. Thus, foot member 32 is adapted to make a four-point engagement with the pallet 1 and, hence, renders the associated upright firm against accidental removal.

Although the posts of frames A, B, C, and D have been described as being located at the corners of the pallets, it is evident that the same could readily be located at the mid-points of the pallet sides should the same be desired. For such positioning, the feet or base members 8, 32, or 38, as the case may be, will be dimensioned for engagement with a relatively narrow deck board and be presented in axial normal relationship to those immediately adjacent.

Of particular importance is the fact that the pallet tiering frames of the present invention can support stacked assemblies thereabove without necessitating a careful precise alignment of the load elements. The unique construction of such frames allows a constituent of the stacked assembly to be placed on the upper portion of the frame immediately therebelow in such manner as to be obviously supported, without regard to the disposition of constituents in the lower portion of the assembly.

Another noteworthy feature of the frames of this invention is the resistance thereof to twisting or distortion under load. The upper portions provide a cross bracing which rigidifies such frames and effectively counters any turning moments created by unaligned load elements.

It is apparent that the present frames are disposed for use with standard pallets and hence have general application. Thus, special pallets are not required that the standard pallets used are not in any way altered whereby the same are available for normal usage, or with the frames, as desired.

The details of construction can be varied without departing from the spirit of the invention and the exclusive use of those modifications coming within the scope of the claims contemplated.

What is claimed is:

1. A tiering frame for use with pallets comprising a pair of identical sections, each section comprising a pair of spaced vertical posts and a generally V-shaped top member comprising a pair of legs diverging toward their outer ends, said legs being secured adjacent their outer ends to the upper ends of the posts for presentation in a plane normal to the posts above and parallel to the upper surface of a pallet, said legs of each top member being connected in their inner, converging portions, means at the inner converging portions of the legs separably securing the top members together, and means for detachably engaging the lower ends of said posts on a pallet.

2. A tiering frame as defined in claim 1 in which the means separably securing the top members together is comprised of a male member and a female member spaced apart on each top member, the male member on one top member detachably engaged in the female member in the other top member.

3. A tiering frame for use with pallets comprising a pair of identical sections, each section comprising a pair of spaced, vertical posts and a generally V-shaped top member comprising a pair of legs, the legs of each top member being secured adjacent their outer ends to the upper ends of the posts for presentation in a plane normal to the posts above and parallel to the upper surface of a pallet with the apex or inner end portion of the generally V-shaped top member being presented toward the other section, means separably securing the top member together at their inner end portions, and means for detachably engaging the lower ends of said posts on a pallet.

4. A tiering frame as defined in claim 3 in which the means separably securing the top members together is comprised of a pin and opening spaced apart on the outer side of the inner end of each top member, the pin on one member detachably engaged in said opening in the other member.

5. A tiering frame as defined in claim 3 in which the means separably securing the top members together is comprised of a hook secured to the outer face of the inner end of each top member, said hooks being horizontally disposed and releasably engaged with each other.

6. A tiering frame as defined in claim 5 wherein the portions of each top member between their associated pin and opening are in abutment when the sections are in joined, operative condition.

References Cited in the file of this patent

UNITED STATES PATENTS

| | | |
|---|---|---|
| 2,092,690 | Baldwin | Sept. 7, 1937 |
| 2,434,360 | Hess | Jan. 13, 1948 |
| 2,495,711 | Fletcher | Jan. 31, 1950 |
| 2,540,254 | Garber | Feb. 6, 1951 |
| 2,683,010 | Hammerslag | July 6, 1954 |
| 2,686,645 | Whitehurst | Aug. 17, 1954 |

FOREIGN PATENTS

| | | |
|---|---|---|
| 1,049,764 | France | July 6, 1954 |

OTHER REFERENCES

National Pallet (Advertisement), Modern Materials Handling Corp., page 57, July 1949.